US010811766B2

(12) United States Patent
Johnson et al.

(10) Patent No.: US 10,811,766 B2
(45) Date of Patent: *Oct. 20, 2020

(54) INTEGRATED, EXTERNALLY-MOUNTED ADS-B DEVICE

(71) Applicant: Appareo Systems, LLC, Fargo, MD (US)

(72) Inventors: Jeffrey L Johnson, West Fargo, ND (US); Bradley R Thurow, Fargo, ND (US)

(73) Assignee: Appareo Systems, LLC, Fargo, ND (US)

( * ) Notice: Subject to any disclaimer, the term of this patent is extended or adjusted under 35 U.S.C. 154(b) by 240 days.

This patent is subject to a terminal disclaimer.

(21) Appl. No.: 15/895,596

(22) Filed: Feb. 13, 2018

(65) Prior Publication Data
US 2018/0175487 A1    Jun. 21, 2018

Related U.S. Application Data

(63) Continuation of application No. 14/567,965, filed on Dec. 11, 2014, now Pat. No. 9,893,413.

(51) Int. Cl.
*H01Q 1/28* (2006.01)
*G01S 19/14* (2010.01)
*G01S 19/36* (2010.01)
*G01S 13/78* (2006.01)
*G08G 5/00* (2006.01)
*H01Q 21/28* (2006.01)

(52) U.S. Cl.
CPC ............. *H01Q 1/28* (2013.01); *G01S 13/781* (2013.01); *G01S 19/14* (2013.01); *G01S 19/36* (2013.01); *G08G 5/0008* (2013.01); *G08G 5/0013* (2013.01); *H01Q 21/28* (2013.01)

(58) Field of Classification Search
CPC ........ H01Q 1/28; H01Q 21/28; G08G 5/0008; G08G 5/0013; G01S 19/36; G01S 13/781; G01S 19/14
USPC ....................................... 342/357.4
See application file for complete search history.

(56) References Cited

U.S. PATENT DOCUMENTS 3,656,164 A * 4/1972 Rempt ............... H01Q 1/28
                                                343/705
5,296,861 A * 3/1994 Knight ............. G01S 19/55
                                                342/357.38

(Continued)

OTHER PUBLICATIONS

Google search for 3M aerospace tapes websites before Dec. 31, 2010. (Year: 2010).*

*Primary Examiner* — Frank J McGue
(74) *Attorney, Agent, or Firm* — Hovey Williams LLP

(57) ABSTRACT

An integrated, externally-mounted Automated Dependent Surveillance-Broadcast (ADS-B) device comprising in one embodiment a 1030 MHz transmitter, a 1030 MHz antenna, a 1090 MHz receiver, a 1090 MHz antenna, a GNSS receiver, at least one GNSS antenna, a 978 MHz transmitter, and a 978 MHz antenna, wherein these components are integrated into a single enclosure, and wherein the GNSS antenna is placed at least partially into a projection extending out from the main enclosure body, such that the GNSS antenna has improved visibility to GNSS signals originating from altitudes above the current altitude of aircraft when the ADS-B device is mounted on the bottom of an aircraft.

15 Claims, 17 Drawing Sheets

(56) References Cited

U.S. PATENT DOCUMENTS

| | | | |
|---|---|---|---|
| 6,422,518 B1* | 7/2002 | Stuff | B64C 23/06 244/130 |
| 7,068,233 B2* | 6/2006 | Thornberg | H01Q 1/06 343/727 |
| 7,624,951 B1* | 12/2009 | Kraft | B64C 1/36 244/1 R |
| 8,102,301 B2* | 1/2012 | Mosher | G08G 5/0013 342/30 |
| 9,893,413 B2* | 2/2018 | Johnson | G01S 19/14 |
| 2003/0063004 A1* | 4/2003 | Anthony | B60R 25/102 340/574 |
| 2007/0159378 A1* | 7/2007 | Powers | G01S 7/003 342/29 |
| 2007/0252748 A1* | 11/2007 | Rees | H01Q 1/28 342/29 |
| 2009/0146875 A1* | 6/2009 | Hovey | G08G 5/04 342/357.31 |
| 2011/0282521 A1* | 11/2011 | Vlad | H01Q 1/002 701/3 |
| 2012/0038501 A1 | 2/2012 | Schulte et al. | |
| 2012/0098714 A1* | 4/2012 | Lin | H01Q 1/28 343/705 |
| 2014/0197981 A1 | 7/2014 | Hartley et al. | |

* cited by examiner

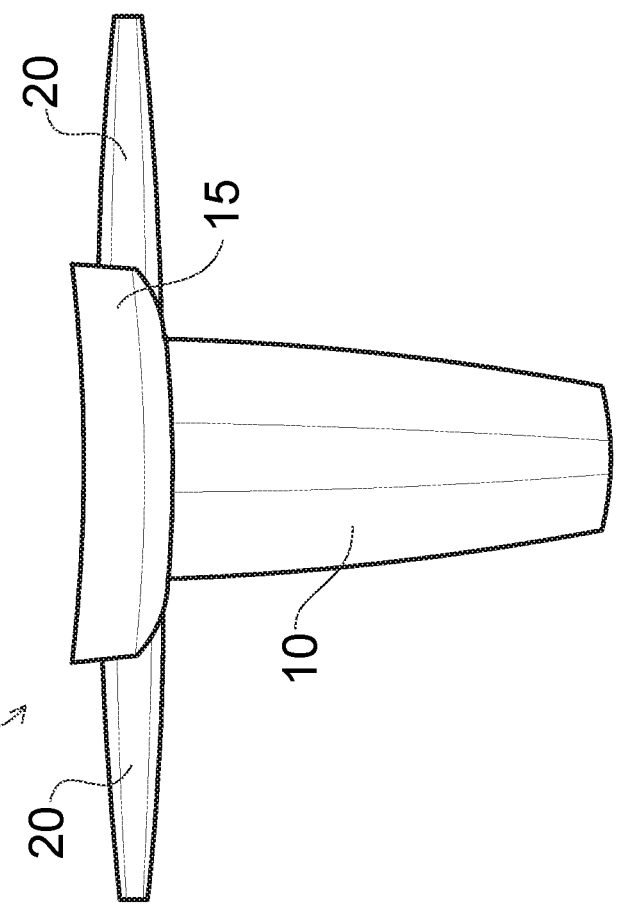
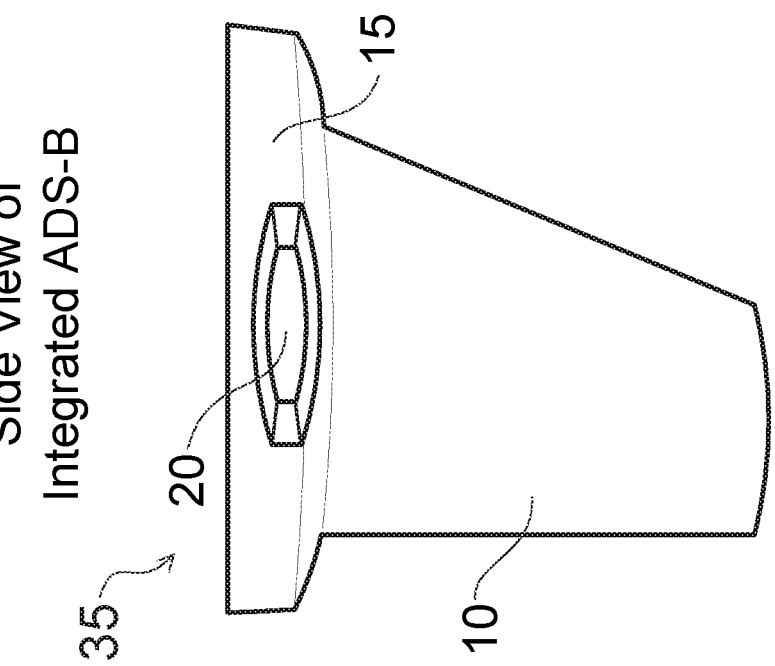

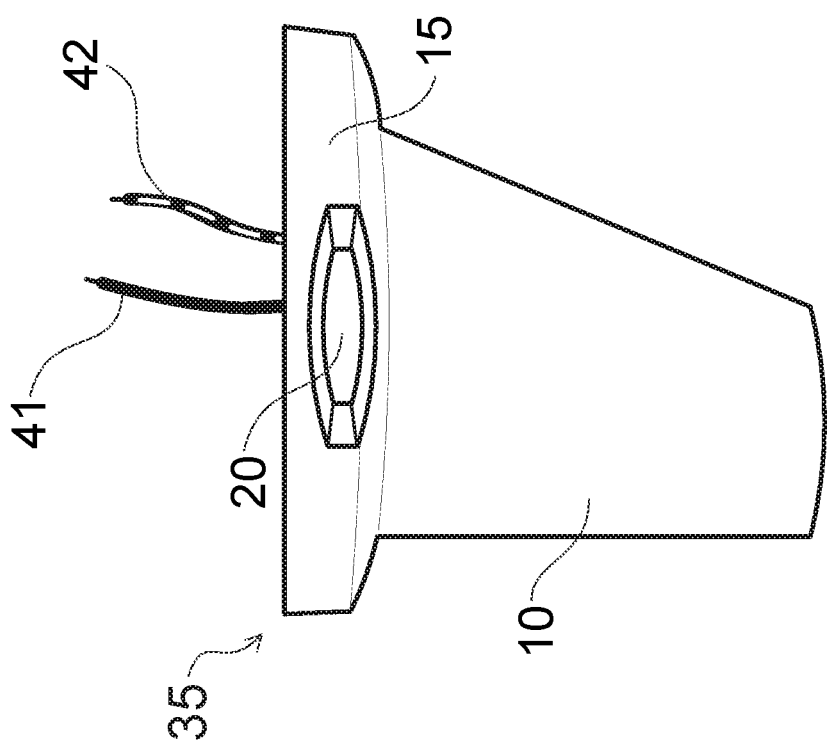

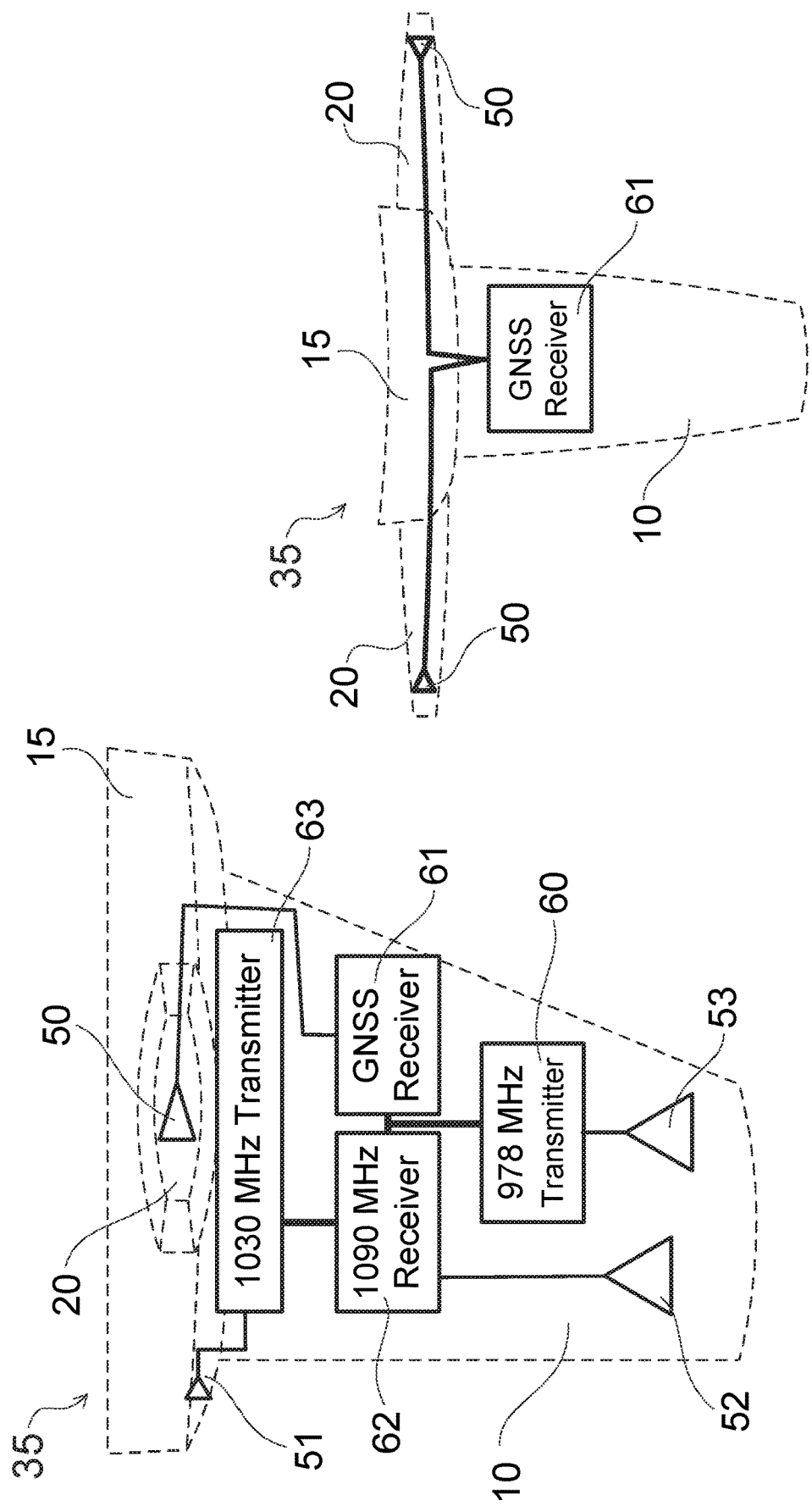

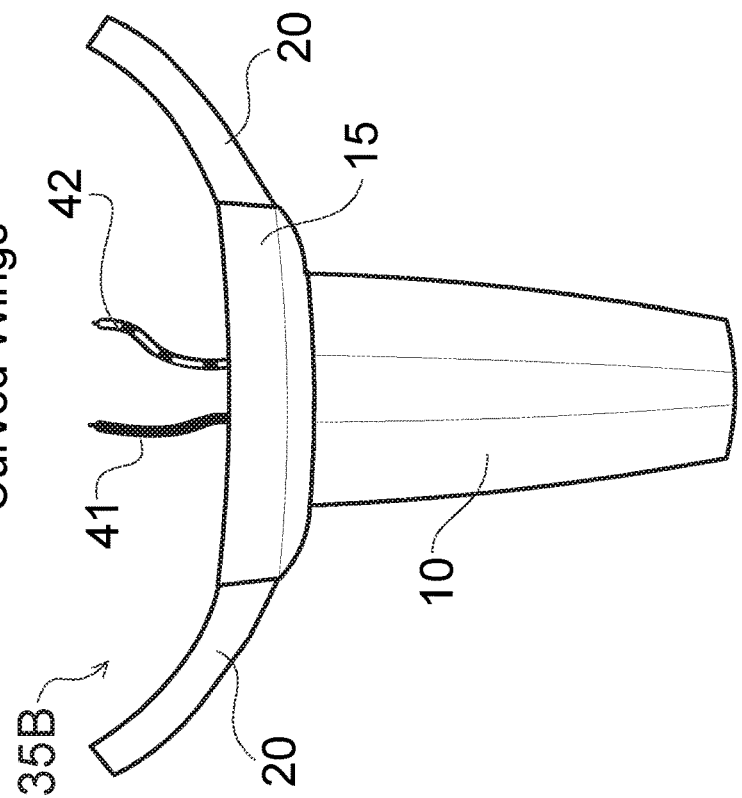
Fig. 13 Front View of Fin with Curved Wings
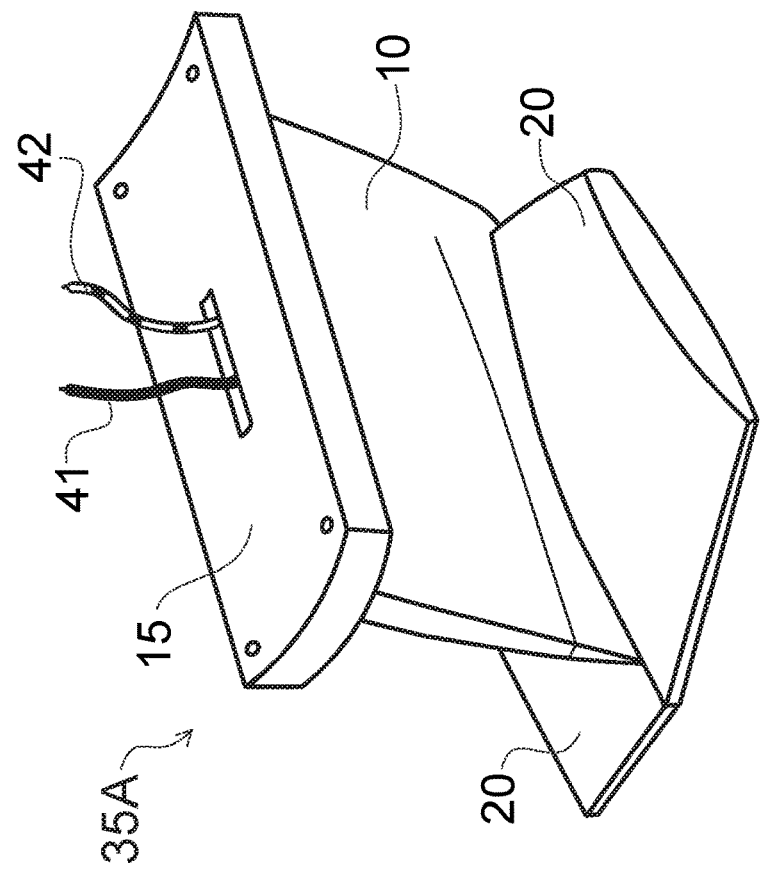
Fig. 12 Alternate Form Factor with Wings on Bottom of Fin Front View of Integrated ADS-B with Static Port Side View of Integrated ADS-B with Static Port

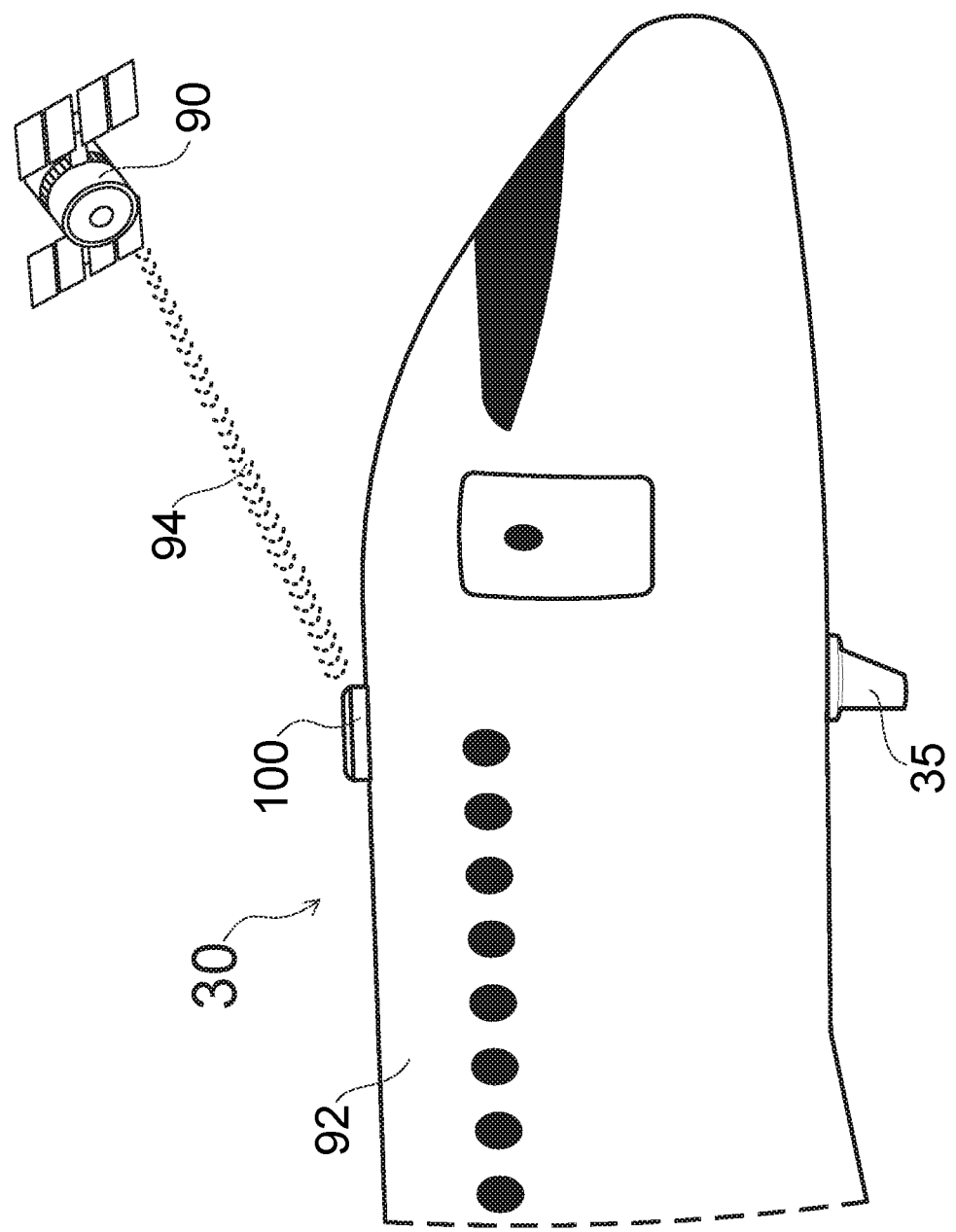

INTEGRATED, EXTERNALLY-MOUNTED ADS-B DEVICE

CROSS-REFERENCE TO RELATED APPLICATION

This application is a continuation of and claims priority in U.S. patent application Ser. No. 14/567,965, filed Dec. 11, 2014, now U.S. Pat. No. 9,893,413, issued Feb. 13, 2018 which is incorporated herein by reference.

BACKGROUND OF THE INVENTION

1. Field of the Invention

The present invention relates generally to the field of aviation, and specifically to an Automated Dependent Surveillance-Broadcast (ADS-B) navigation device that can be mounted on the exterior or an aircraft.

2. Description of the Related Art

The Federal Aviation Administration (FAA), the national aviation authority in the United States with the authority to regulate and oversee all aspects of American civil aviation, has mandated the use of ADS-B Out by Jan. 1, 2020. ADS-B is the implementation of the FAA's Next Generation Air Transportation System, or "NextGen", a system designed to replace the aging and limited radar-based system currently used by air traffic controllers to track aircraft in controlled airspace.

ADS-B is an aircraft and satellite-based transmission system. It can be broken down into two main functions: ADS-B Out and ADS-B In.

An aircraft with ADS-B Out will transmit its position (derived from a certified GPS source) and its velocity to other aircraft, and Air Traffic Control (ATC) ground stations using an ADS-B modified Mode S transponder or a Universal Access Transceiver (UAT).

An aircraft with ADS-B In can receive information from other aircraft transmitting ADS-B information, and can also receive traffic and weather information, which will be broadcast for free.

The FAA ADS-B mandate currently requires only ADS-B Out be implemented in operation aircraft by Jan. 1, 2020. ADS-B In is currently considered optional for aircraft, and it not included in the 2020 FAA mandate. Many countries outside the United States already have an existing, in-force mandate for ADS-B equipped aircraft, or have a deadline for implementation well before 2020.

The installation of an ADS-B system on an aircraft is typically best done by a qualified avionics shop and is not easily done by an A&P (Aircraft and Powerplant) mechanic or other personnel. Given the number of aircraft currently in operation, and based on the number of avionics shops that are available to do the work, it may not be possible for all aircraft which need ADS-B Out installations on time to meet the mandated deadline of Jan. 1, 2020. There are a large number of A&P mechanics in the country, relative to the number of avionics shops, but it is more involved to have an A&P mechanic install a complex avionics system. An A&P mechanic, however, readily installs antennas on the outside of the aircraft and performs other aircraft maintenance tasks.

What is needed in the art is an ADS-B system that has been designed such that it can be mounted easily by an A&P mechanic or other available personnel, and which reduces the cost and complexity from existing ADS-B systems.

SUMMARY OF THE INVENTION

According to one aspect of the invention, an ADS-B device is described comprising a 1030 MHz transmitter; a 1030 MHz antenna, a 1090 MHz receiver; a 1090 MHz antenna; a GNSS receiver; at least one GNSS antenna; a 978 MHz transmitter; an enclosure comprising a main enclosure body; and at least one projection; wherein the 1030 MHz transmitter, the 1030 MHz antenna, the 1090 MHz receiver, the 1090 MHz antenna, the GNSS receiver, the at least one GNSS antenna, and the 978 MHz transmitter are contained within the enclosure, wherein the at least one GNSS antenna is placed at least partially into the at least one projection, wherein the enclosure is mounted to the underside of the exterior of an aircraft, wherein the at least one projection extends out from the enclosure such that the at least one GNSS antenna has improved visibility to GNSS signals originating from altitudes above the current altitude of aircraft, wherein the 1090 MHz receiver receives data transmitted by an external 1090 MHz transponder for use in preparing an ADS-B broadcast, and wherein the 1030 MHz transmitter may be used to request a transmission of data from the external 1090 MHz transponder.

According to another aspect of the invention, an ADS-B device is described, comprising a 1090 MHz receiver; a 1090 MHz antenna; a GNSS receiver; at least one GNSS antenna; a 978 MHz transmitter; an enclosure comprising a main enclosure body; and at least one projection; wherein the 1090 MHz receiver, the 1090 MHz antenna, the GNSS receiver, the at least one GNSS antenna, and the 978 MHz transmitter are contained within the enclosure, wherein the at least one GNSS antenna is placed at least partially into the at least one projection, wherein the enclosure is mounted to the underside of the exterior of an aircraft, wherein the at least one projection extends out from the enclosure such that the at least one GNSS antenna has improved visibility to GNSS signals originating from altitudes above the current altitude of aircraft, and wherein the 1090 MHz receiver receives data transmitted incidentally by an external 1090 MHz transponder for use in preparing an ADS-B broadcast.

According to yet another aspect of the invention, an ADS-B device is described, comprising a 1030 MHz transmitter, a 1030 MHz antenna, a 1090 MHz receiver; a 1090 MHz antenna; a GNSS receiver; at least one GNSS antenna; a 978 MHz transmitter; a static pressure port; a static pressure encoder; an enclosure comprising a main enclosure body; and at least one projection; wherein the 1030 MHz transmitter, the 1030 MHz antenna, the 1090 MHz receiver, the 1090 MHz antenna, the GNSS receiver, the at least one GNSS antenna, the 978 MHz transmitter, and the static pressure encoder are contained within the enclosure, wherein the static pressure port is integral to the exterior of the enclosure, wherein the at least one GNSS antenna is placed at least partially into the at least one projection, wherein the enclosure is mounted to the underside of the exterior of an aircraft, wherein the at least one projection extends out from the enclosure such that the at least one GNSS antenna has improved visibility to GNSS signals originating from altitudes above the current altitude of aircraft, wherein the static pressure port senses a static air pressure, wherein the static pressure encoder receives and encodes a static air pressure reading from the static pressure port, wherein the static air pressure reading is used to calculate a pressure altitude for use in an ADS-B broadcast, and wherein the 1090 MHz receiver receives an external pressure altitude reading transmitted by an external 1090 MHz transponder and wherein the external pressure altitude reading is used to calculate a correction to the pressure altitude calculated from the static air pressure reading received from the static pressure encoder.

According to yet another aspect of the invention, an ADS-B device is described, comprising a 1090 MHz receiver, a 1090 MHz antenna, a GNSS receiver, at least one GNSS antenna, a 978 MHz transmitter, a 978 MHz antenna, a first enclosure, and a second enclosure, wherein the 1090 MHz receiver, the 1090 MHz antenna, the 978 MHz transmitter, the GNSS receiver, and the 978 MHz antenna are contained within the first enclosure, wherein the at least one GNSS antenna is placed in the second enclosure, wherein the first enclosure is mounted to the underside of the exterior of an aircraft, wherein the second enclosure is mounted such that the at least one GNSS antenna has improved visibility to GNSS signals originating from altitudes above the current altitude of aircraft, wherein the 1090 MHz receiver receives data transmitted by an external 1090 MHz transponder for use in preparing an ADS-B broadcast.

These aspects, as well as the features, functions, and advantages described herein, can be achieved independently in various embodiments of the present invention or may be combined in yet other embodiments in which further details can be seen with reference to the following description and drawings.

BRIEF DESCRIPTION OF DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present invention when read in conjunction with the accompanying drawings.

FIG. 1A is a side view of one embodiment of a form factor for a new, externally mounted ADS-B device.

FIG. 1B is a front view of one embodiment of a form factor for a new, externally mounted ADS-B device.

FIG. 5 is another side view of one embodiment of a form factor for a new, externally mounted ADS-B device, showing the only required connections being a power wire and an electrical ground wire.

FIG. 6 is a block diagram of the functional components of one embodiment of an externally-mounted ADS-B system, with a dashed outline of an embodiment of an external enclosure (as seen from the side).

FIG. 7 is a simplified version of FIG. 6 showing only the GNSS receiver and the GNSS antennae, with a dashed outline of an external enclosure as seen from the front, showing how the GNSS antennae might be routed out into the winglets.

FIG. 12 is an alternate embodiment of the enclosure for an externally-mounted ADS-B system where the winglets appear on the bottom of the enclosure, such that they can be better positioned to receive GNSS satellite signals.

FIG. 13 is another alternate embodiment of the enclosure for an externally-mounted ADS-B system where the winglets are bent such that they follow the curve of the aircraft fuselage to which the device is mounted, such that they can be better positioned to receive GNSS satellite signals.

FIG. 20 depicts how the separate GNSS module and ADS-B device might be mounted in the alternate embodiment of the system of FIGS. 19A and 19B.

DETAILED DESCRIPTION OF THE INVENTION

I. Introduction and Environment

Figure 2:
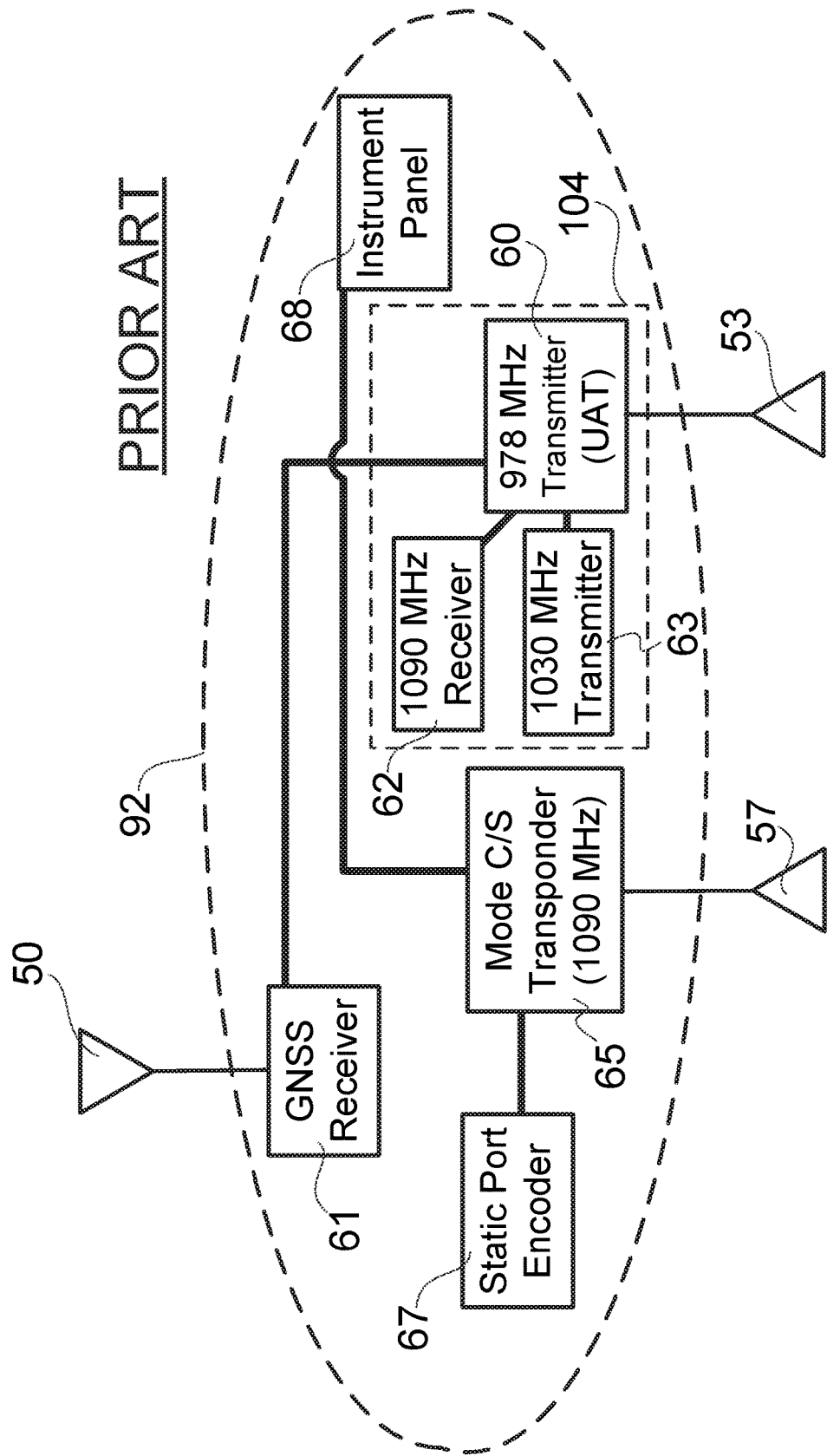
FIG. 2 is a block diagram of the components of functions needed on a typical aircraft in the prior art to implement an ADS-B system.

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Preferred Embodiment

With reference now to the drawings, and in particular to FIGS. 1A through 20 thereof, a new ADS-B device and method of manufacturing said device are described. The invention integrates components (comprising both electronic modules and the corresponding antennae) present in an ADS-B device into a single enclosure which has been designed to survive in the harsh environment seen on the external surface of an aircraft in flight. The single enclosure is designed such that it is similar to the external "fins" or "warts" seen on existing aircraft, and which currently enclose and protect the antennae associated with electronic modules normally found in the interior of the aircraft. By combining several of the electronic modules, as well as the antennae required by these modules, into a single package which can be mounted on the exterior of the aircraft, an A&P mechanic can easily make the installation, addressing the concerns over total compliance by Jan. 1, 2020, and the overall complexity of the system is reduced (including a reduction in the number of antenna fins/warts mounted on the outside of an aircraft).

FIG. 1A is a side view of one embodiment of a form factor for a new, externally mounted ADS-B device. FIG. 1B is a front view of the same embodiment of a form factor for a new, externally mounted ADS-B device as seen in FIG. 1A. These figures are labeled with the same reference designators and should be viewed together for a complete understanding of the form factor.

The form factor of the enclosure shown in FIGS. 1A and 1B has a main enclosure body 10, a mounting base 15, and at least one winglet 20. In FIGS. 1A and 1B, the enclosure is shown shaped as a fin, similar to the enclosure used for many of the antennae that are currently mounted on the exterior of aircraft today. However, any appropriate shape may be used for the enclosure. For example, the main enclosure body 10 may be shaped like a rounded "bump" or "wart", or any similar shape that does not produce excessive aerodynamic drag and which provides winglets 20 or similar projections.

The main enclosure body 10 contains the electronic modules required to perform the ADS-B related functions, and these modules will be described in additional detail later in this specification and in later figures. The mounting base 15 allows the enclosure to be mounted on the exterior of an aircraft and may contain hardware or features to allow attachment to the aircraft fuselage. The mounting base 15 will also allow the electrical connections such as power and ground wires to pass out through the top of the enclosure to be patched into the aircraft. The winglets 20 extend out from the enclosure such that they will allow any antennae which they contain to have the best possible "view" to any GNSS (global navigation satellite system, such as the global positioning system, or GPS, for example) satellites which appear at altitudes much higher than the aircraft (that is, well above the aircraft). The winglets 20 are designed to bring the antennae out away from the main enclosure in order to get out from as much as possible of the "shadow" of the aircraft fuselage. The purpose and content of the winglets 20 will be better described later in this specification and in later figures.

The shape and size of winglets 20 may vary significantly, and their precise shape and size may be dependent on the shape and size of the aircraft to which they are attached. The winglets 20 may curve up or down, may be angled up or down, may be attached at the bottom of the main enclosure body 10 instead of the top, or may actually be adhered to the aircraft fuselage itself, extending up and wrapping around the fuselage. Several variations on the form factor of the winglets will be shown in later figures, but any appropriate shape and size of the winglets 20 which provides better visibility to GNSS or similar satellites above the aircraft may be used.

FIG. 2 is a block diagram of the components of functions needed on a typical aircraft in the prior art to implement an ADS-B system. The requirements of an "ADS-B Out" system state that an aircraft broadcast the following pieces of information once every second:

The ICAO aircraft type designator (based on the type of the aircraft).

The "squawk" code the aircraft is using. (The squawk code is a four-digit code assigned by Air Traffic Control, typically during departure clearance, to uniquely identify an aircraft.)

The current position of the aircraft, usually derived from a GPS signal.

The pressure altitude of the aircraft.

The velocity of the aircraft.

This information can be transmitted by the universal access transmitter (UAT) 60, which is a transmitter on the aircraft set to broadcast information at the set frequency of 978 MHz. The UAT 60 can obtain information for its position from a GNSS receiver 61 (for example, a certified GPS receiver, or any other appropriate type of GNSS technology). The UAT 60 can use this position information to calculate its velocity, by determining the distance traveled in the time between sampling data from the GNSS receiver 61. The ICAO code can be programmed into the ADS-B system, since the aircraft type will never change. Ideally, the squawk code and the pressure altitude are received as a broadcast transmission from a separate transponder on the aircraft, which may be a Mode C or a Mode S transponder 65, a transponder operating at 1090 MHz which is designed to broadcast information including the pressure altitude and the squawk code when it detects a broadcast request at 1030 MHz from an exterior source (such as an air traffic control tower). The Mode C/S transponder 65 obtains the squawk code from the instrument panel 68, where it has been entered by the pilot, and the pressure altitude is derived from the pressure altitude reading obtained from the static port encoder 67, a digital encoder attached to the aircraft's static port.

To obtain the squawk code and pressure altitude reading from the Mode C/S transponder 65, the aircraft may include an optional 1090 MHz receiver 62 which will receive the broadcasts from the Mode C/S transponder 65. If the Mode C/S transponder 65 is not broadcasting when the UAT 60 needs the squawk code and pressure altitude, then an optional 1030 MHz transmitter 63 can be used to send a request to the Mode C/S transponder 65 to force it to broadcast as needed.

The addition of ADS-B functionality to an aircraft that does not already have it can be quite complex, as illustrated by FIG. 2. A minimum of three antennas are required, the GNSS receiver antenna 50, the UAT antenna 53, and the transponder antenna 57. These are just the antennas that extend beyond the fuselage 92 of the aircraft, and do not include other antennas which may be inside the fuselage 92, in the interior of the aircraft, which may be needed for components such as the 1090 MHz Receiver 62 and the 1030 MHz transmitter 63.

A dashed line 104 is drawn around the UAT 60, the 1090 MHz receiver 62, and the 1030 MHz transmitter 63, indicating these three devices are typically contained in a single, shared enclosure in the prior art and may use the same antenna 53 for receiving 1090 MHz transmissions and transmitting 1030 MHz and 978 MHz data. It should also be noted that the 1090 MHz antenna 57 shown in FIG. 2 may also be used by the Mode C/S transponder to receive broadcast requests on 1030 MHz.

The current methods and equipment available in the prior art to implement ADS-B require the installation of new avionics modules in the interior of the aircraft (inside the fuselage 92) and thus the installation is typically performed (today, using existing solutions) by an avionics shop, and not by an A&P mechanic. This is a significant limitation on the mandate of ADS-B Out installed on all operating aircraft by Jan. 1, 2020.

Figure 3:
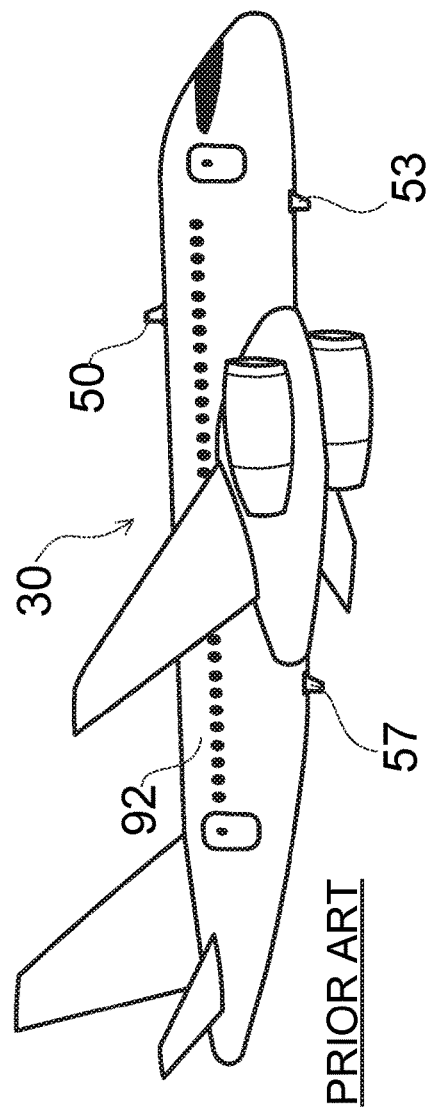
FIG. 3 shows how the antennas are mounted on a typical aircraft for an ADS-B system of the prior art.

FIG. 3 shows how the antennas (those shown in FIG. 2, for example) are mounted on a typical aircraft for an ADS-B system of the prior art. The GNSS antenna 50 is mounted directly on the top side of the fuselage (the exterior surface) 92 of an aircraft 30. The GNSS antenna 50 is mounted on top of the aircraft 30 to give it the best visibility to geosynchronous satellites (the satellites that provide the GNSS signals used to derive location data).

The transponder antenna 57 and the UAT antenna 53 are typically mounted on the underside of an aircraft 30, so that air traffic control ground stations have best visibility to the broadcasts. The antennas shown in FIG. 3 may only be a subset of the actual antennae present on an aircraft. FIG. 3 includes those antennae most pertinent to the invention described herein.

Figure 4:
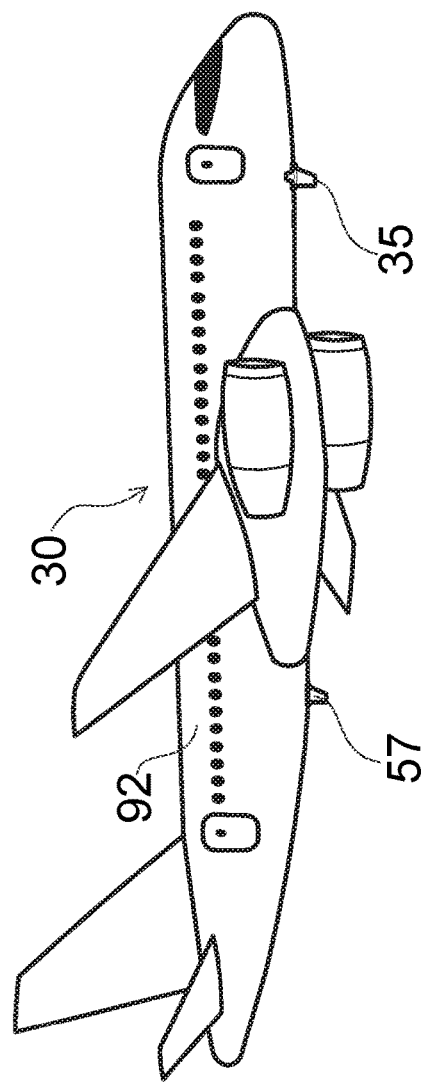
FIG. 4 shows how the antennas might be mounted on a typical aircraft for one embodiment of an externally-mounted ADS-B system.

FIG. 4 shows how the antennas might be mounted on a typical aircraft for one embodiment of an externally-mounted ADS-B system. The GNSS antenna (item 50 of FIG. 3) and the UAT antenna (item 53 of FIG. 3) are combined into the integrated, externally-mounted ADS-B system 35 described herein. This combination of antennae (as well as the inclusion of components typically found inside the interior of the aircraft, as will be described in later figures) reduces the number of antenna needed on the exterior fuselage 92 of the aircraft 30.

FIG. 5 is another side view of one embodiment of a form factor for a new, externally mounted ADS-B device 35, showing the only required connections being a power wire 41 and an electrical ground wire 42. The other components—including the winglets 20, the main enclosure body 10, and the mounting base 15—are identical to what they were in FIG. 1A, and are included here for completeness.

As will be shown in FIG. 6, the invention described herein takes several of the components required for the implementation of an ADS-B system as shown in FIG. 2, including antennas found on the exterior of the fuselage 92 and also electronics modules found on the interior of the aircraft 30, and combines then into a single form factor 35 (such as that shown in FIG. 5) that is mounted on the exterior of the fuselage 92. Because the form factor 35 thus produced allows an ADS-B system to be implemented simply by attaching form factor 35 to the exterior of a fuselage 92, requiring only mechanical attachment and wiring of the power wire 41 and the ground wire 42, an A&P mechanic can easily add an ADS-B system using form factor 35.

FIG. 6 is a block diagram of the functional components of one embodiment of an externally-mounted ADS-B system, with a dashed outline of an embodiment of an external enclosure (as seen from the side). This embodiment of the externally-mounted ADS-B system integrates the following components into the form factor 35, allowing the system to be mounted external to the aircraft 30, on the outside of the fuselage 92 (as shown in FIG. 4):

A GNSS receiver 61, adapted to receive signals transmitted by one or more GNSS satellites.

A 978 MHz transmitter (also known as a UAT) 60, adapted to transmit aircraft identification information, position, and altitude.

A 1090 MHz receiver 62, adapted to receive transmissions from a separate Mode C or Mode S transponder 65 on the aircraft.

A 1030 MHz transmitter 63, adapted to transmit a request to the separate Mode C or Mode S transponder 65 on the aircraft to command it to transmit its data.

At least one GNSS antenna 50, positioned so that it extends into the winglets 20 to allow it to have better visibility to GNSS satellites positioned above the plane in altitude.

A UAT antenna 53, to direct broadcasts from the 978 MHz transmitter 60 in the appropriate direction.

A 1090 MHz antenna 52, to allow the 1090 MHz receiver 62 to receive broadcasts from the Mode C or Mode S transponder 65.

A 1030 MHz antenna 51, to direct broadcasts from the 1030 MHz transmitter 63 in the appropriate direction.

All of the components described above are integrated into a single form factor 35, situated primarily in the main enclosure body 10 or potentially inside the mounting base 15, with the GNSS antenna 50 positioned in the winglets 20 for best viewing to the "constellation" of available GNSS satellites.

FIG. 7 is a simplified version of FIG. 6 showing only the GNSS receiver 61 and the GNSS antennae 50, with a dashed outline of an external enclosure as seen from the front, showing how the GNSS antennae might be routed out into the winglets. The other components shown in FIG. 6 have been omitted for clarity, so that FIG. 7 focuses on the positioning of the GNSS antennae in the winglets 20.

It should be noted that the UAT antenna 53, the 1090 MHz antenna 52, and the 1030 MHz antenna 51 may actually be implemented as one common antenna, or combined in different functional subsets into two antennae, as the frequency of each is close enough to the others to allow a common antenna design. The GNSS antenna 50 will be separate from the other three (51, 52, and 53) in all embodiments.

Figure 8:
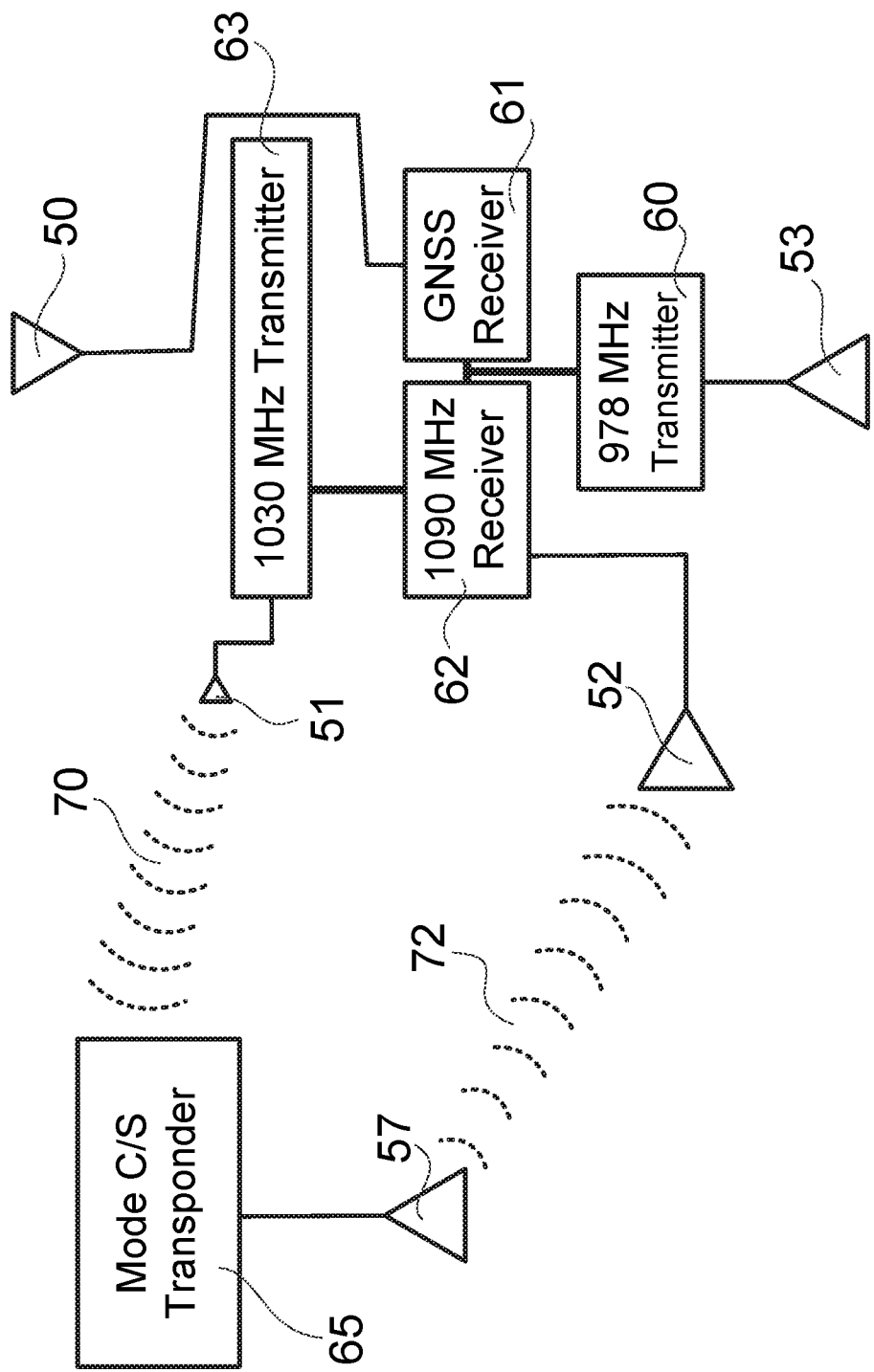
FIG. 8 is a block diagram of the functional components of one embodiment of an externally-mounted ADS-B system, shown operating in conjunction with the aircraft's Mode C transponder.

FIG. 8 is a block diagram of the functional components of one embodiment of an externally-mounted ADS-B system, shown operating in conjunction with the aircraft's Mode C or Mode S transponder 65. It should be noted that either a Mode C or a Mode S transponder will provide the appropriate functionality described herein, and both types of transponders are not required, only one or the other. The term "Mode C/S" may be used, as in FIG. 8, to indicate either a Mode C or a Mode S transponder, and it does not mean that both types of transponder are required.

The components shown in FIG. 8 are the same as those shown in FIG. 6, but without the dashed outline showing the enclosure, and with the addition of the Mode C/S transponder 65 and the transponder antenna 57.

In an operational scenario, when the ADS-B system needs to obtain information from the Mode C/S transponder 65 (as previously described in this specification), it will transmit a transponder request 70 at a frequency of 1030 MHz using the 1030 MHz transmitter 63 and the corresponding 1030 MHz antenna 51. The Mode C/S transponder 65 will receive the transponder request 70, which will trigger the Mode C/S transponder 65 to broadcast the data signal 72 (the content of which has been previously described in this specification) at a frequency of 1090 MHz. This 1090 MHz transmission 72 will be received by the 1090 MHz antenna 52 and processed by the 1090 MHz receiver 62 for use in the ADS-B system.

It should be noted that the Mode C/S transponder 65 will receive similar 1030 MHz transponder requests from other sources external to the aircraft, especially when within controlled airspace. The same format and frequency requests are transmitted by other sources including air traffic control. Because of this, the Mode C/S transponder 65 may at times be broadcasting the data signal 72 almost constantly during a flight, because of the 1030 MHz transponder requests coming external to the aircraft. It may be possible, in these circumstances, that the 1030 MHz transmitter 63 and the 1030 MHz antenna 51 may not be required in the externally-mounted ADS-B system as described herein. An alternate embodiment of the externally-mounted ADS-B system based on this concept is shown in FIG. 9.

Figure 9:
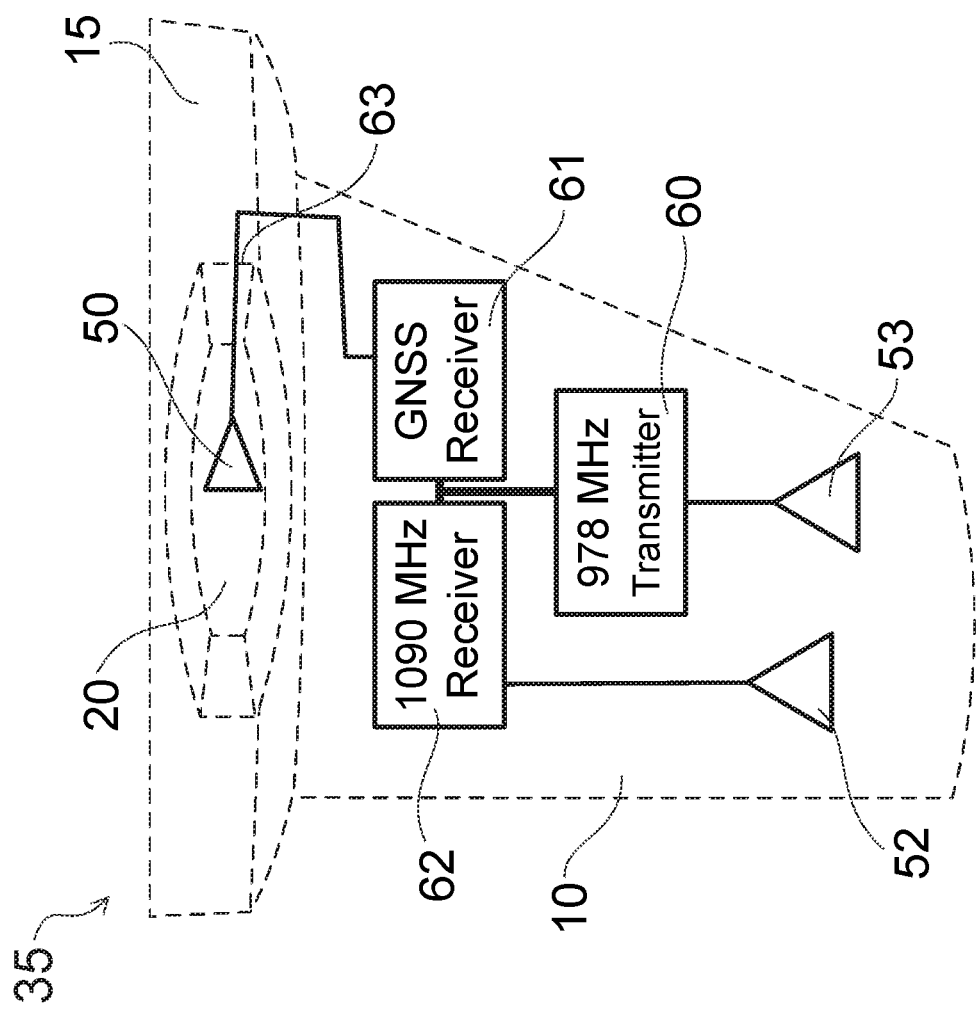
FIG. 9 is a block diagram of the functional components of an alternate embodiment of an externally-mounted ADS-B system, one which does not include the ability to transmit a request to the Mode C transponder of the aircraft.

FIG. 9 is a block diagram of the functional components of an alternate embodiment of an externally-mounted ADS-B system, one with does not include the ability to transmit a request to the Mode C/S transponder 65 of the aircraft. The alternate embodiment shown in FIG. 9 is identical to the embodiment shown in FIG. 6, except that it does not have a 1030 MHz transmitter 63 and the 1030 MHz antenna 51. This embodiment relies on the fact that, at least in some areas, the Mode C/S transponder 65 will be coincidentally broadcasting based on transponder requests 70 from sources external to the aircraft 30, such that no transponder request 70 need be broadcast from the ADS-B system.

Figure 10:
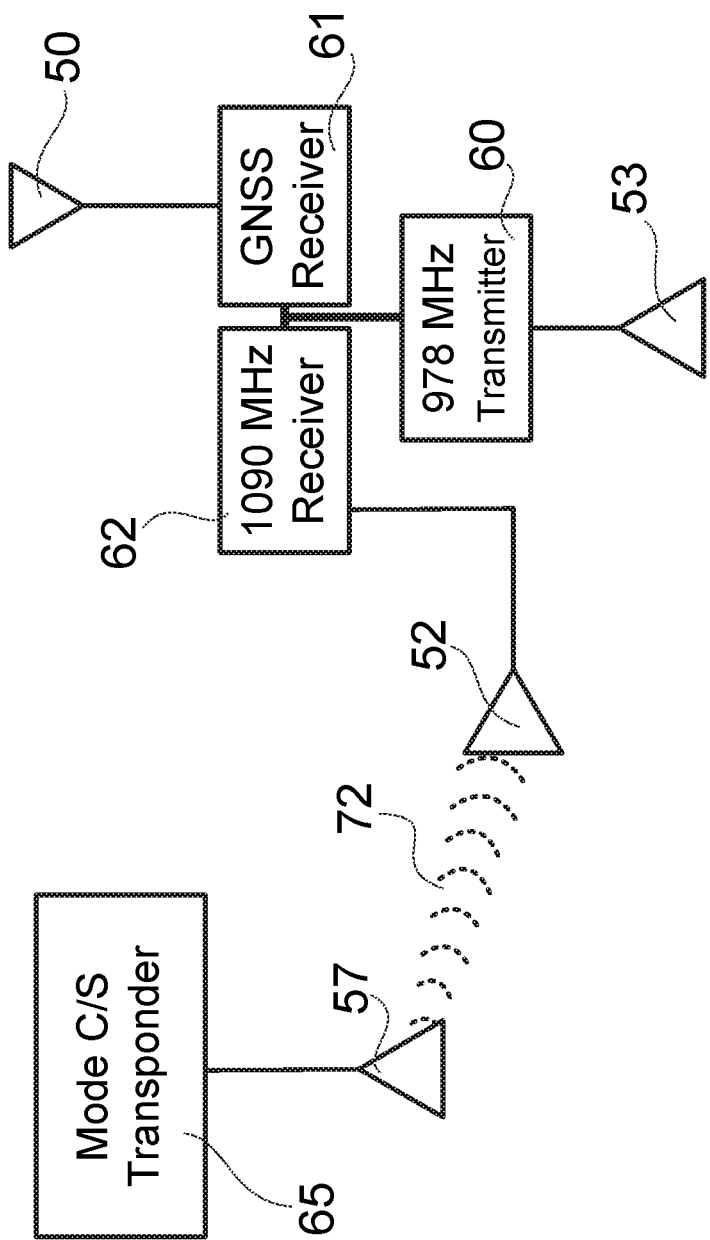
FIG. 10 is a block diagram of the functional components of the alternate embodiment of an externally-mounted ADS-B system of FIG. 9, shown operating in conjunction with the aircraft's Mode C transponder.

FIG. 10 is a block diagram of the functional components of the alternate embodiment of an externally-mounted ADS-B system of FIG. 9, shown operating in conjunction with the aircraft's Mode C/S transponder 65. FIG. 10 is identical to the block diagram of FIG. 8, except that it does not have a 1030 MHz transmitter 63 and the 1030 MHz antenna 51, and therefore cannot trigger a transponder request 70. This embodiment of the ADS-B system monitors any existing transmissions 72 from the Mode C/S transponder 65, but cannot force the Mode C/S transponder 65 to broadcast.

Figure 11:
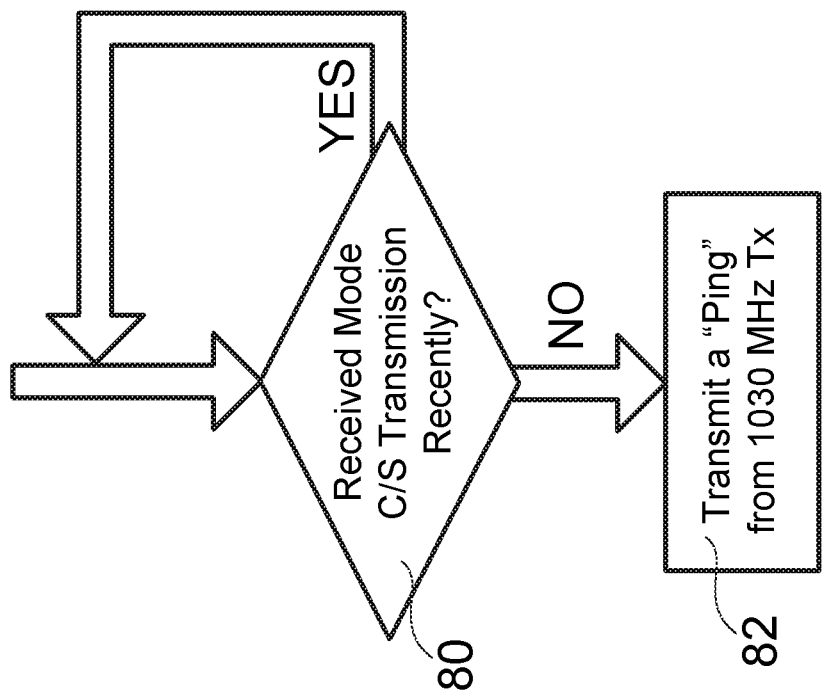
FIG. 11 is a flowchart showing how the externally-mounted ADS-B system can limit the number of requests it needs to make to the Mode C transponder.

In the embodiments in which the externally-mounted ADS-B system has a 1030 MHz transmitter 63 and the 1030 MHz antenna 51, such as the embodiment shown in FIGS. 6 and 8, the externally-mounted ADS-B system may transmit transponder requests that are unnecessary, since there are times when the Mode C/S transponder 65 will already be transmitting almost constantly. Generating extraneous radio frequency (RF) transmissions in an area already crowded with RF may overwhelm the system and cause performance issues. FIG. 11 is a flowchart showing how the externally-mounted ADS-B system can limit the number of requests it needs to make to the Mode C/S transponder.

The flowchart depicted in FIG. 11 represents an algorithm running inside the externally-mounted ADS-B system. The first part of the flowchart, starting with Step 80, is a continuous loop, likely executing at or faster than the frequency of the required transmission rate of the ADS-B information, although this statement is not meant to be limiting or imply that other rates may not work in certain conditions.

In Step 80 of FIG. 11, the algorithm asks if a transmission has been received from the Mode C/S transponder recently, where "recently" is defined to mean since the last broadcast of ADS-B information. If the answer is "Yes", implying that a transmission has been received from the Mode C/S transponder since the last broadcast, nothing needs to be done. In the case, the algorithm will continued to loop checking to see if the transmission from the Mode C/S transponder has been received.

If the answer is "No", then the algorithm advances to Step 82, transmitting a "ping" from the 1030 MHz transmitter in order to force a transmission from the Mode C/S transponder. This algorithm will help to ensure that the information obtained from the Mode C/S transponder is the most recent and will eliminate unnecessary RF transmissions from the 1030 MHz transmitter.

FIG. 12 is an alternate form factor 35A of the enclosure for an externally-mounted ADS-B system. In this embodiment, the winglets 20 appear on the bottom of the main enclosure body 10, such that they can be better positioned to receive GNSS satellite signals. Lowering the winglets 20 as far as they can be, pushing them away from the body of the aircraft, will give them better visibility to the constellation of GNSS satellites.

FIG. 13 is another alternate embodiment 35B of the enclosure for an externally-mounted ADS-B system where the winglets 20 are bent such that they follow the curve of the aircraft fuselage 92 (not shown in FIG. 13) to which the device is mounted, such that they can be better positioned to receive GNSS satellite signals while still limiting the amount of aerodynamic drag they may introduce to the aircraft. The winglets 20 may be substantially longer than those shown in FIG. 13, wrapping up around the fuselage 92 to position the GNSS antenna 50 (see FIG. 8, for instance, for GNSS antenna 50) at a point high enough along the fuselage to maximize the visibility to the constellation of GNSS satellites.

Figure 14:
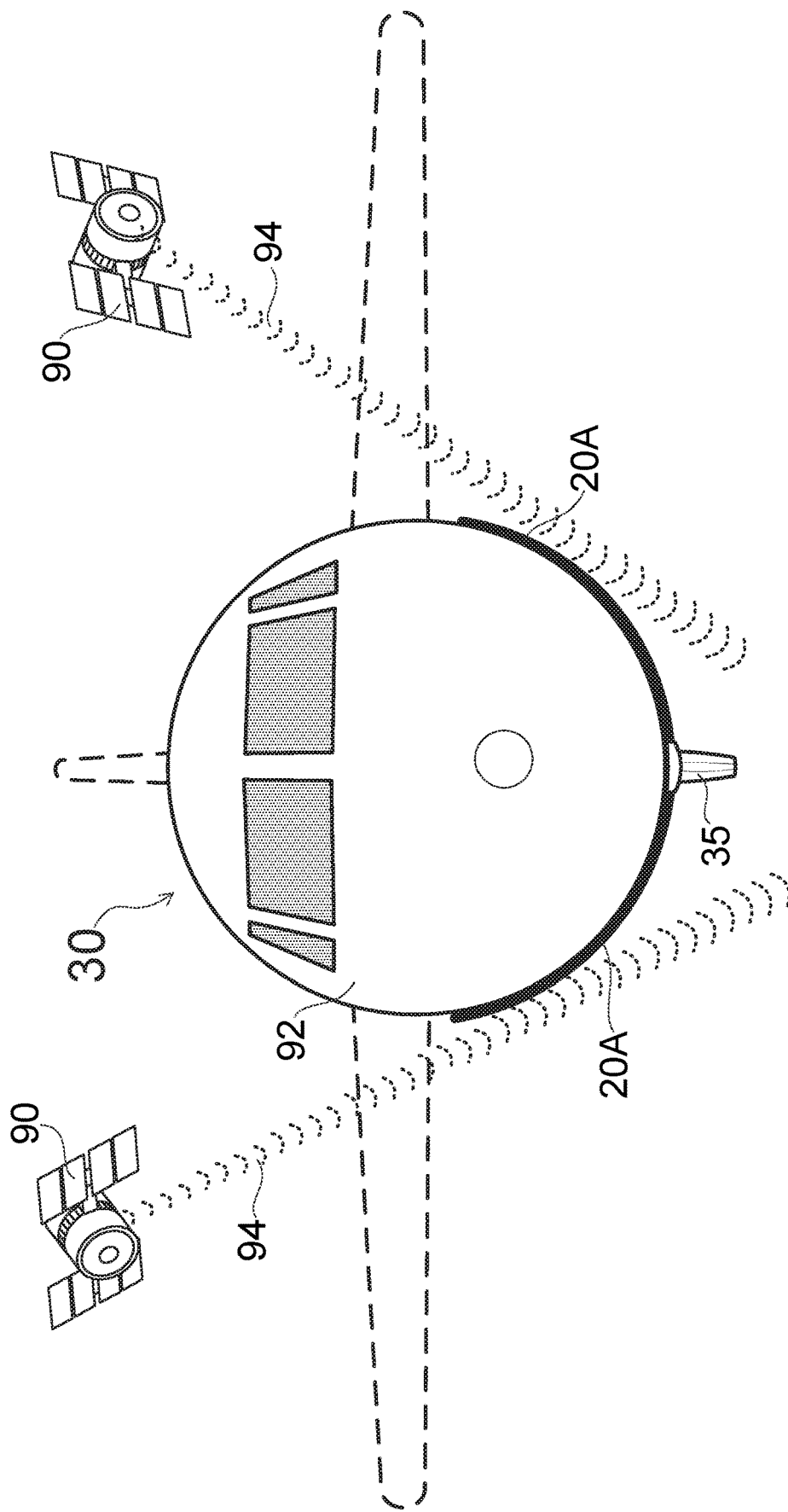
FIG. 14 shows a front view of yet another alternate embodiment of the externally-mounted ADS-B system using adhesive strips to allow the GPS antennas to be positioned farther up the aircraft, making them better positioned to receive GNSS satellite signals.

FIG. 14 shows a front view of yet another alternate embodiment 35 of the externally-mounted ADS-B system. In this embodiment, the winglets 20A are adhered to the fuselage 92 of the aircraft using special aviation-grade adhesive strips (or any other appropriate means for connecting the winglets 20A to the fuselage) to allow the GNSS antennas to be positioned farther up the aircraft, making them better positioned to see the GNSS satellites 90. As shown in FIG. 14, the timing signals 94 transmitted by the GNSS satellites 90 may not be able to reach the externally-mounted ADS-B device 35 on the bottom of the fuselage 92. However, the timing signals 94 can more easily reach the adhesive strip winglets 20A placed farther up the fuselage 92.

Figure 15:
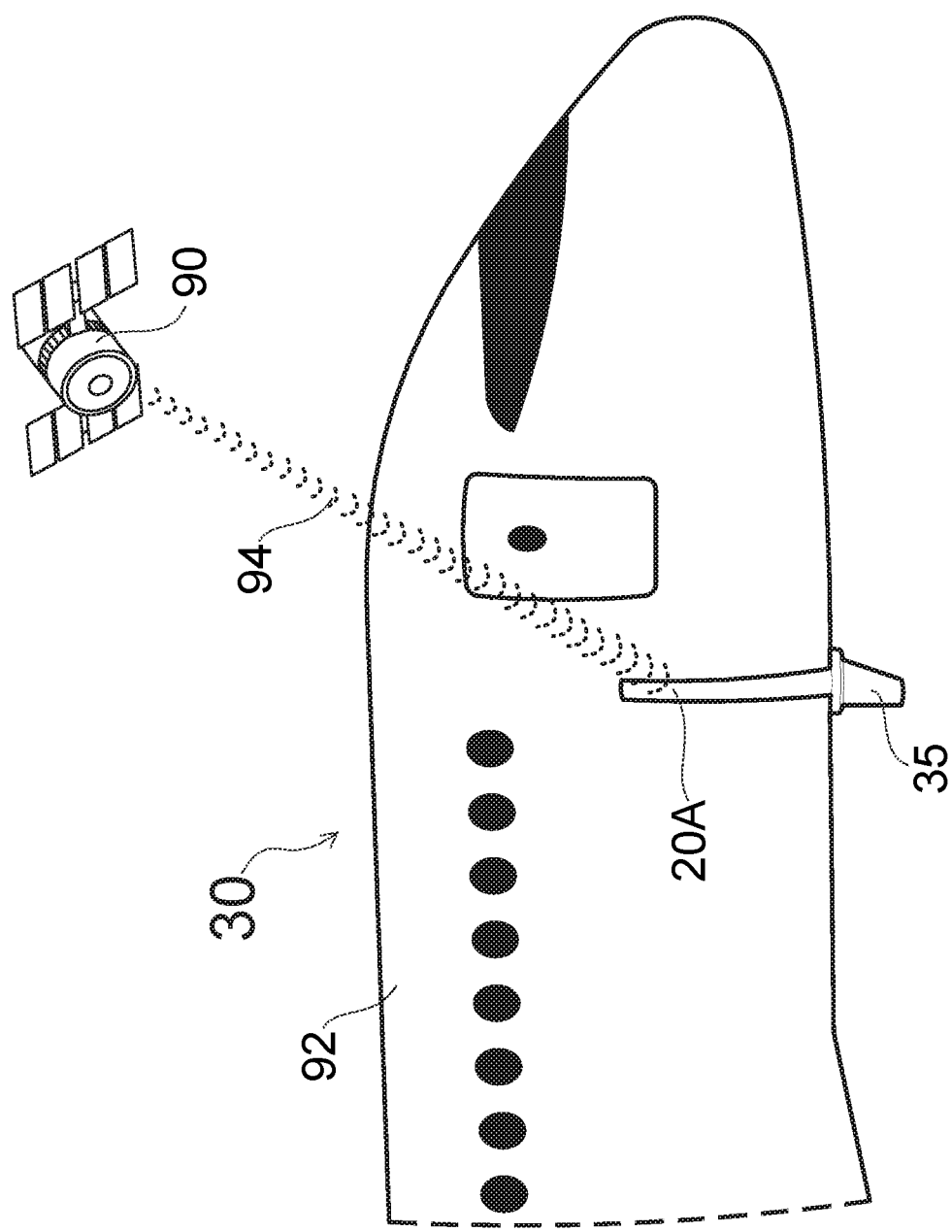
FIG. 15 shows the side view of the alternate embodiment of the externally-mounted ADS-B system of FIG. 14.

FIG. 15 shows the side view of the alternate embodiment 35 of the externally-mounted ADS-B system of FIG. 14, showing how the winglets 20A may extend up the side of the fuselage 92, where the timing signal 94 from the GNSS satellite 90 will reach them.

In the alternate embodiment shown in FIGS. 14 and 15, the extended winglets 20A may be embedded in a strip of aviation-grade adhesive tape such as the aerospace and aircraft maintenance adhesive tape available from 3M and other companies. The tape is designed to adhere to the fuselage 92 of an aircraft and withstand the extreme temperature and environmental conditions to which the fuselage 92 is exposed, without significantly changing the aerodynamic characteristics of the aircraft 30.

Figure 16B:
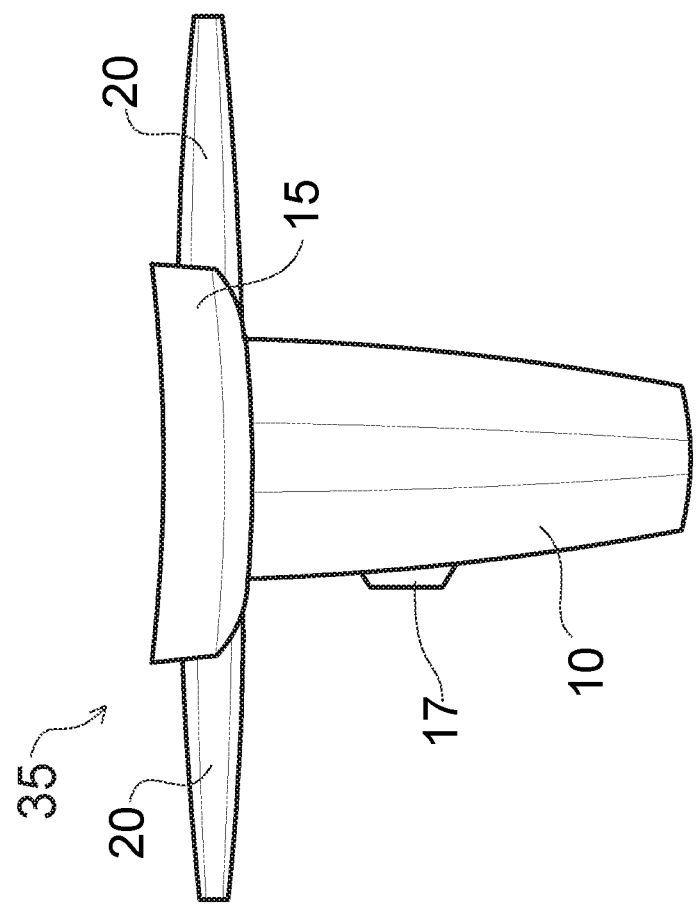
FIG. 16B is a front view of an alternate embodiment of a form factor for a new, externally mounted ADS-B device, incorporating a static pressure port.
Figure 16A:
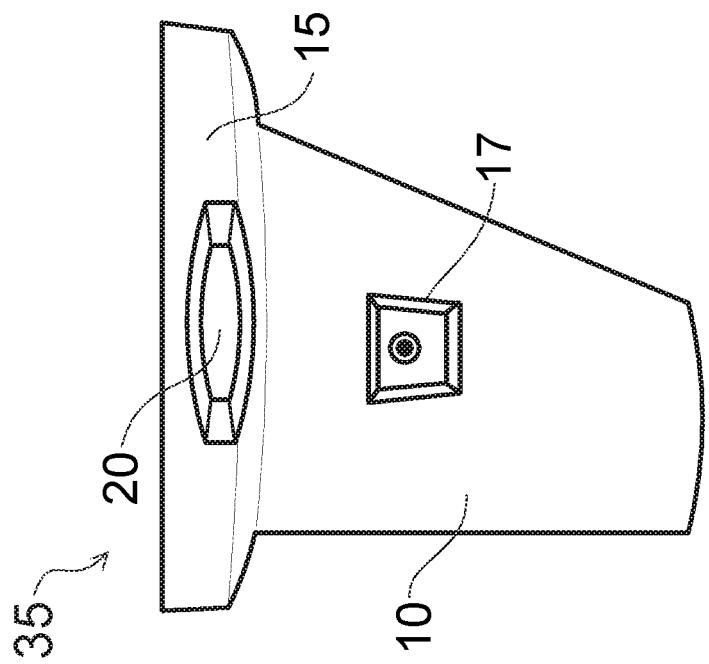
FIG. 16A is a side view of an alternate embodiment of a form factor for a new, externally mounted ADS-B device, incorporating a static pressure port.

FIG. 16A is a side view of an alternate embodiment of a form factor for a new, externally mounted ADS-B device 35, incorporating a static pressure port 17. FIG. 16B is a front view of the same alternate embodiment. Looking at both FIGS. 16A and 16B, we see that, in addition to the main enclosure body 10, the mounting base 15, and the winglets 20, this alternate embodiment has a static pressure port 17. It may be impractical for the externally-mounted ADS-B 35 to have continual access to the information being broadcast by the Mode C/S transponder. For example, in the alternate embodiment of the externally-mounted ADS-B device shown in FIG. 9 and FIG. 10, there is no 1030 MHz transmitter to use to "ping" the Mode C/S transponder and force a broadcast. This alternate embodiment of FIGS. 9-10 simply relies on the fairly constant broadcasting of the Mode C/S transponder information as requested by other sources, such as air traffic control or other aircraft.

It may be possible, however, for the externally-mounted ADS-B device 35 to obtain or generate the information it needs to broadcast from alternate sources. For example, the externally-mounted ADS-B device could, in one embodiment, read the "squawk" code entered by the pilot visually, using a camera mounted inside the flight deck and optical character recognition to read the code and transmit it wirelessly to the externally-mounted ADS-B device.

One limitation on obtaining information from other, separate sources than the Mode C/S transponder is the FAA requirement that the pressure altitude being broadcast by the ADS-B device be the same as the pressure altitude being broadcast by the Mode C/S transponder. Having two separate altitudes being broadcast, even if only a little different from each other, could lead to confusion and dangerous situations. The Mode C/S transponder obtains its pressure altitude reading by being directly wired to the static port encoder (See FIG. 2, Item 67) which is responsible for reading the analog static pressure from the static pressure port and converting it to a digital value for use by the Mode C/S transponder. The easiest way to obtain the pressure altitude reading that the Mode C/S transponder reads from the static port encoder 67 is to listen to the Mode C/S broadcast of that information. However, if the embodiment of the externally-mounted ADS-B device being used does not have the ability to transmit a broadcast request to the Mode C/S transponder, there may be periods much longer than the once-a-second broadcast frequency required for ADS-B transmissions where there is no Mode C/S transponder broadcast available.

In order to compensate for this, the alternate embodiment of the externally-mounted ADS-B device 35 in FIGS. 16A and 16B (as well as FIGS. 17-18) offers a "local" static port 17. This static port 17 could be used to generate a pressure altitude reading. However, it should be noted that the static pressure seen by the static port 17 that is integral to the externally-mounted ADS-B device 35 may be slightly different than the static pressure read by the Mode C/S transponder from the static port encoder 67 on the aircraft. The two separate static ports (the one that is part of the aircraft itself and the one that is integral to the externally-mounted ADS-B device) will be in different locations on the outside of the fuselage of the aircraft and may be subject to different turbulence or pressure patterns. Even if they could be mounted in the exact same location, different devices can be subject to manufacturing and performance differences that could introduce slight variations between the two readings.

In order to coordinate the two pressure readings (per the FAA requirement previously stated), the externally-mounted ADS-B device of FIGS. 16A-18 will still obtain the pressure altitude reading from the Mode C/S transponder when it is broadcasting, and it will compare that pressure altitude to the pressure altitude seen by the externally-mounted ADS-B device, and calculate a "correction factor" to compensate for any differences introduced by the static port on the externally-mounted ADS-B device. This correction factor will be constantly updated when the Mode C/S transponder is transmitting, and the correction factor will be used to correct the static pressure readings on the externally-mounted ADS-B device when the Mode C/S transponder is not transmitting.

Although the differences between the two static pressure ports may change over time and under different conditions, it is thought that the drift will not be significant in the short term, during those few times when the Mode C/S transponder is not broadcasting. When the aircraft is in controlled airspace and/or a crowded airspace, where an accurate pressure altitude is most vital, the Mode C/S transponder will be transmitting almost constantly, and the error correction will remain up-to-date. At other times, the last calculated correction factor can be used to correct the "local" static pressure reading until the next Mode C/S transponder is received.

Figure 17:
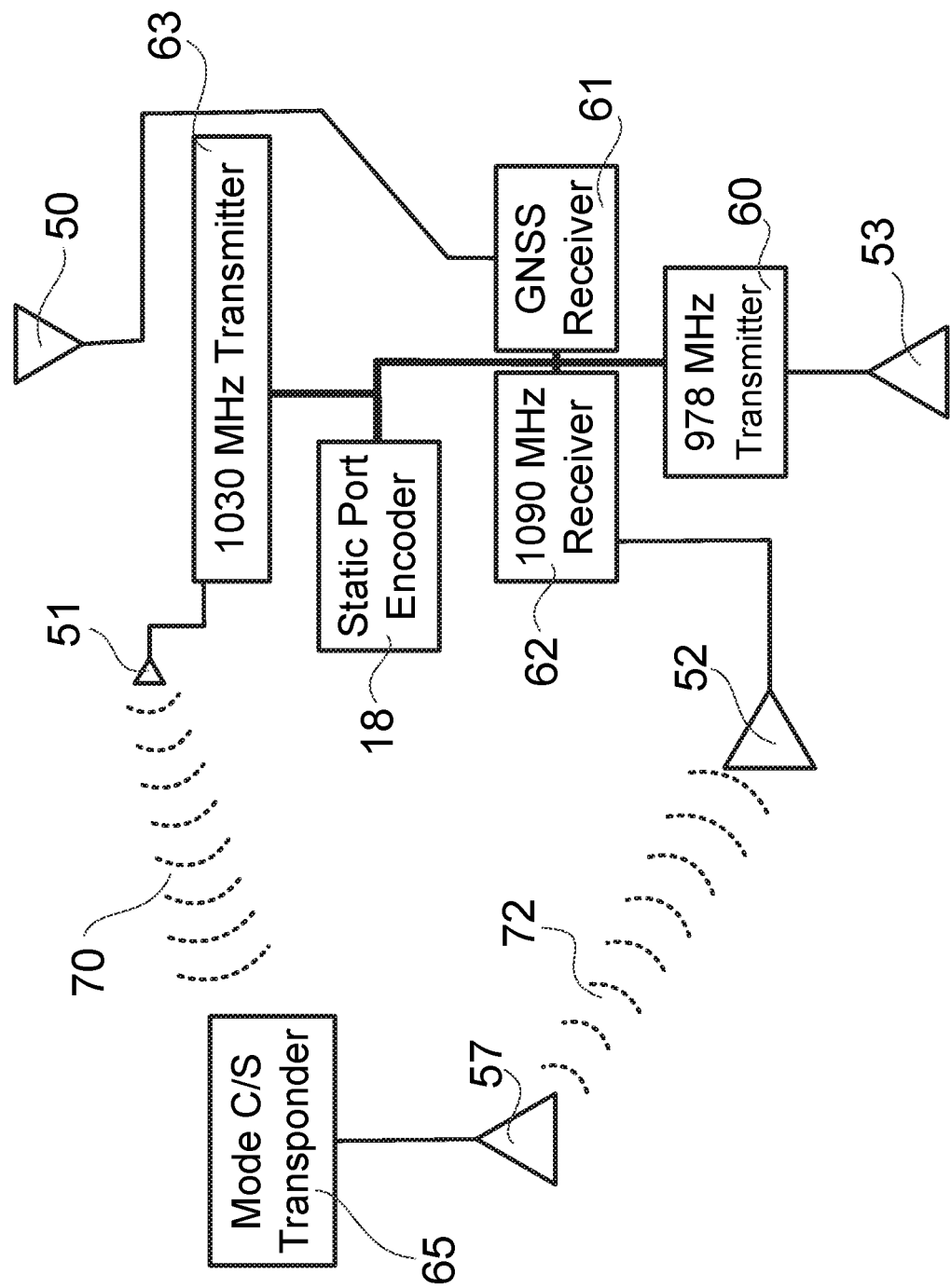
FIG. 17 is a block diagram of the functional components of an alternate embodiment of an externally-mounted ADS-B system, incorporating a static pressure port, with a dashed outline of an embodiment of an external enclosure (as seen from the side).

FIG. 17 is a block diagram of the functional components of an alternate embodiment of an externally-mounted ADS-B system, incorporating a static pressure port, with a dashed outline of an embodiment of an external enclosure (as seen from the side). In this version of the externally-mounted ADS-B device, there is a 1030 MHz transmitter 63 which can transmit a transponder request 70 to the Mode C/S transponder 65, triggering a 1090 MHz transmission 72. In this version, the 1030 MHz transmitter 63 can be used sparingly, if at all, when there is a significant gap in the 1090 MHz transmissions 72. Other than the addition of a local static port encoder 18, which will read and encode the analog static pressure reading from the local static port 17, the other items on FIG. 17 should be identical to those on FIG. 8.

Figure 18:
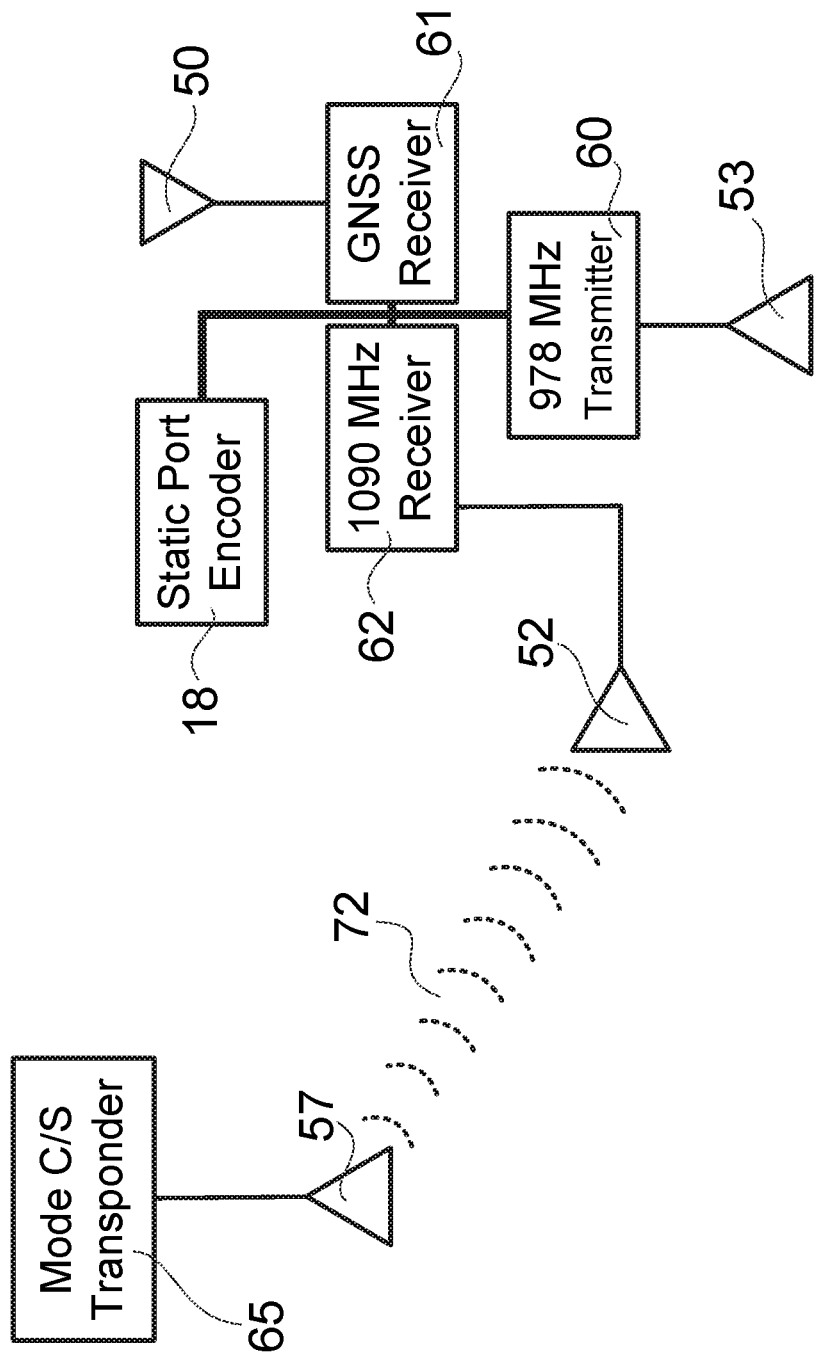
FIG. 18 is a block diagram of the functional components of an alternate embodiment of an externally-mounted ADS-B system incorporating a static pressure port, one which does not include the ability to transmit a request to the Mode C transponder of the aircraft.

FIG. 18 is a block diagram of the functional components of an alternate embodiment of an externally-mounted ADS-B system 35 incorporating a static pressure port 17, one which does not include the ability to transmit a request to the Mode C transponder of the aircraft. In this version of the externally-mounted ADS-B device, the 1030 MHz transmitter 63 and the 1030 MHz antenna 51 of FIG. 17 are not present, and the externally-mounted ADS-B device 35 must depend on the frequent broadcasts 72 of the Mode C/S transponder 65 to correct the local static port reading as read from the local static port encoder 18 as previously described.

Figure 19A:
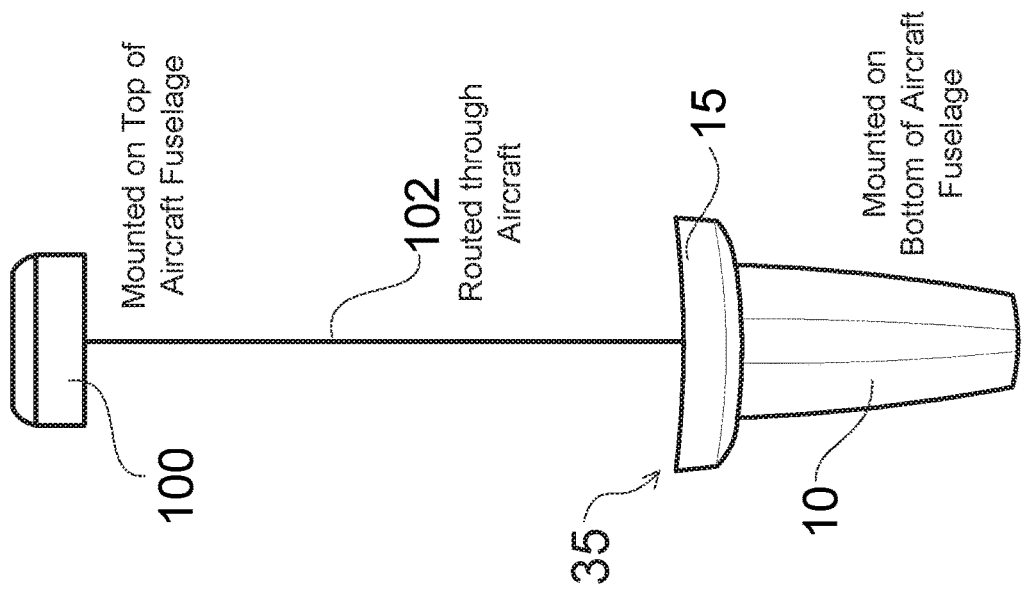
FIG. 19A a side view of an alternate embodiment of a form factor for a new, externally mounted ADS-B device, where the GNSS functionality has been separated into a second module which can be placed in a location better suited for receiving signals from GNSS satellites.
Figure 19B:
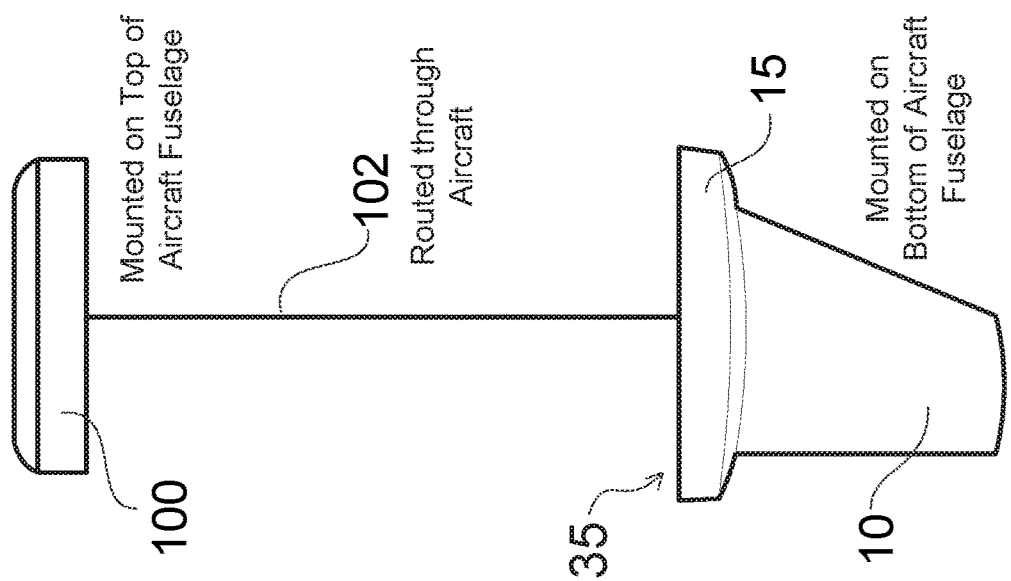
FIG. 19B a front view of an alternate embodiment of a form factor for a new, externally mounted ADS-B device, where the GNSS functionality has been separated into a second module which can be placed in a location better suited for receiving signals from GNSS satellites.

For some aircraft, placing the GNSS antenna on the bottom or underside of the aircraft fuselage may not be practical or effective. Some aircraft may be so large or create such a barrier to the reception of signals from GNSS satellites that a GNSS antenna on the bottom of the fuselage may not be able to see enough GNSS satellites to determine a precise location. Typically, a minimum of four satellites is required to calculate a precise position in three-dimensions including altitude, and the more satellites available, the more precise the calculation. In these instances, it may be ideal to separate the GNSS receiver and antenna in one or more separate modules so that they may be mounted on the top of the fuselage or in a position better able to view the constellation of GNSS satellites. FIGS. 19A, 19B, and 20 illustrate such an embodiment.

FIG. 19A a side view of an alternate embodiment of a form factor for a new, externally mounted ADS-B device, where the GNSS functionality has been separated into a second module which can be placed in a location better suited for receiving signals from GNSS satellites. In this embodiment, the externally-mounted ADS-B device 35 no longer has winglets for the GNSS antennae, as the GNSS receiver and GNSS antenna have been removed from the main enclosure body and/or mounting base 15 and pulled into a separate GNSS module 100. The GNSS module 100 is connected to the externally-mounted ADS-B device 35 via a hard-wired connection 102 that is routed through the aircraft by an A&P mechanic or similar worker.

FIG. 19B a front view of an alternate embodiment of the same form factor for a new, externally mounted ADS-B device shown in FIG. 19A, included for additional clarity.

FIG. 20 depicts how the separate GNSS module 100 and ADS-B device might be mounted to the fuselage 92 of an aircraft 30 in the alternate embodiment of the system of FIGS. 19A and 19B. The GNSS module 100 could be placed on the top side of the fuselage 92 (external to the aircraft 30), or in another appropriate position remote from the externally-mounted ADS-B device 35. In this separate location, the GNSS module 100 is likely better positions to received GNSS signals 94 from the GNSS satellites 90 to which it has visibility.

It should be noted that in one embodiment, the GNSS module 100 would contain both the GNSS receiver (61, as shown in previous figures, such as FIG. 8) and the GNSS antenna (50, as shown in previous figures, such as FIG. 8). In other embodiments, the GNSS module 100 may contain only the GNSS antenna 50, and the GNSS receiver 61 would remain housed in the externally-mounted ADS-B device 35.

Having described the preferred embodiments, it will become apparent that various modifications can be made without departing from the scope of the invention as defined in the accompanying claims. It would be obvious to one skilled in the art to combine features from any of the embodiments captured in the figures and specification herein to create another alternate embodiment. For example, the two-module form factor shown in FIGS. 19A, 19B, and 20 could be combined with the embodiment shown in FIGS. 16A and 16B, wherein a local static pressure port is incorporated into the external module. A static pressure port could also be integrated into the separate GNSS module 100 of FIGS. 19A and 19B instead of into the externally-mounted ADS-B device 35, or the static pressure port could be contained in a third module and connected by wire or wireless transmission to the ADS-B device 35.

Also, the exact shape of the externally-mounted ADS-B device may be different than those shown in the examples. The examples and processes defined herein are meant to be illustrative and describe only particular embodiments of the invention.

While the present invention has been described in terms of one preferred embodiment and a few variations thereof, it will be apparent to those skilled in the art that form and detail modifications may be made to those embodiments without departing from the spirit or scope of the invention.

Having thus described the invention, what is claimed as new and desired to be secured by Letters Patent is:

1. An automatic dependent surveillance-broadcast (ADS-B) device configured for mounting on the exterior of an aircraft including a transponder, said ADS-B device comprising:
    an ADS-B device enclosure configured for attachment to the aircraft exterior;
    a global navigation satellite system (GNSS) receiver in said enclosure and configured for providing a GNSS-defined location of said aircraft;
    a GNSS antenna in said enclosure and connected to said GNSS receiver;
    an ADS-B receiver in said enclosure and configured for monitoring aircraft transponder transmissions including current aircraft information from the aircraft transponder;
    an ADS-B antenna in said enclosure and connected to said ADS-B receiver; and
    an ADS-B transmitter in said enclosure and connected to said ADS-B receiver;
    said ADS-B transmitter being configured to transmit ADS-B information including the GNSS-defined location and the current aircraft,
    the ADS-B device being configured to transmit transponder requests to said transponder,
    wherein the ADS-B device does not transmit transponder requests to said transponder if the ADS-B receiver has received an aircraft transponder transmission since a time of the most recent ADS-B transmitter transmission of the ADS-B information,
    wherein the ADS-B device determines if the ADS-B receiver has received more recent aircraft information from the aircraft transponder since the time of the most recent ADS-B transmitter transmission of the ADS-B information;
    if affirmative said ADS-B transmitter transmits ADS-B information including said more recent aircraft information; and
    if negative said ADS-B device transmits a transponder request for updated current aircraft information.

2. The ADS-B device according to claim 1 wherein said aircraft transponder operates in a C/S mode.

3. The ADS-B device according to claim 1 wherein said ADS-B device continuously loop checks receipt of transmission from said aircraft transponder.

4. The ADS-B device according to claim 1 further comprising a transmitter configured to transmit transponder requests at 1030 MHz.

5. The ADS-B device according to claim 1 wherein said ADS-B receiver is configured to receive said aircraft transponder transmissions at 1090 MHz.

6. The ADS-B device according to claim 1 wherein said aircraft comprises a manned aerial vehicle.

7. The ADS-B device according to claim 1 wherein said aircraft comprises an unmanned aerial vehicle (UAV).

8. The ADS-B device according to claim 1 further comprising a plurality of GNSS antennas including said GNSS antenna, wherein said enclosure includes:
    a main enclosure body mounted on the aircraft exterior; and
    at least one winglet extending from said enclosure body, each of the plurality of GNSS antennas being mounted in the at least one winglet;
    said plurality of GNSS antennas being configured for providing said GNSS receiver with time-differentiated GNSS signals whereby said ADS-B device computes a directional vector for said aircraft.

9. The ADS-B device according to claim 8 wherein:
said main enclosure body extends from the aircraft fuselage and terminates at a distal enclosure body end; and
said at least one winglet extends laterally outwardly from said main enclosure body distal end.

10. The ADS-B device according to claim 8 wherein said at least one winglet is configured to extend up the side of the aircraft.

11. The ADS-B device according to claim 8 further comprising aviation-grade adhesive tape extending from the main enclosure body, said at least one winglet being embedded in said aviation-grade adhesive tape.

12. An ADS-B device configured for mounting on the exterior of an aircraft including a transponder, said ADS-B device comprising:
an ADS-B device enclosure configured for attachment to the aircraft exterior;
a global navigation satellite system (GNSS) receiver in said enclosure and configured for providing a GNSS-defined location of said aircraft;
a GNSS antenna connected to said GNSS receiver;
an ADS-B receiver in said enclosure and configured for monitoring transmissions from the aircraft transponder, the aircraft transponder transmissions including current aircraft information;
an ADS-B antenna connected to said ADS-B receiver;
a transponder request transmitter in said enclosure and configured to transmit transponder requests to the aircraft transponder; and
an ADS-B transmitter in said enclosure and connected to said ADS-B receiver;
said ADS-B transmitter being configured to transmit ADS-B information including the GNSS-defined location and the current aircraft information,
wherein the transponder request transmitter does not transmit transponder requests to the aircraft transponder if the ADS-B receiver has received an aircraft transponder transmission since a time of the most recent ADS-B transmitter transmission of ADS-B information, wherein:
if the ADS-B receiver has received an aircraft transponder transmission since the time of the most recent ADS-B transmitter transmission of ADS-B information, the ADS-B transmitter transmits ADS-B information including more recent aircraft information; and
if the ADS-B receiver has not received an aircraft transponder transmission since the time of the most recent ADS-B transmitter transmission of ADS-B information, the transponder request transmitter transmits a transponder request to the aircraft transponder for updated current aircraft information.

13. The ADS-B device of claim 12, further comprising a static port, the ADS-B device being configured to determine a pressure altitude via the static port.

14. The ADS-B device of claim 13, wherein the ADS-B device is configured to apply a compensation to the pressure altitude according to a compensation factor resulting from a difference between a pressure altitude reported by the aircraft transponder and a contemporary pressure altitude determined via the static port.

15. The ADS-B device of claim 14, wherein the correction factor is updated for each pressure altitude reported from the aircraft transponder.

\* \* \* \* \*